Jan. 22, 1935.  A. HELGASON  1,988,734

TRANSFORMER

Filed May 28, 1934

INVENTOR
ARNI HELGASON
BY Robert C. Kahn
ATTORNEY

Patented Jan. 22, 1935

1,988,734

UNITED STATES PATENT OFFICE 1,988,734

TRANSFORMER

Arni Helgason, Wilmette, Ill., assignor to Chicago Transformer Corporation, Chicago, Ill., a corporation of Illinois Application May 28, 1934, Serial No. 727,843

4 Claims. (Cl. 175—361)

This invention relates to transformers and particularly to a means and method for holding a transformer in assembled relation prior to permanent mounting on a base. In transformers, particularly small power transformers for radio receivers and similar apparatus, it is customary to mount the transformer on a base or pan with a portion of the transformer depending through a suitable aperture in the base. The edge of the aperture in the base supports the transformer around the edge thereof and the transformer leads are usually brought out from the lower end. The transformer comprises the usual stack of laminations with one or more windings. In order to maintain the laminations intact it is customary to have bolts through the edges of the laminations. It is also customary, however, to utilize the same bolts and the accompanying nuts for mounting the transformer on the base, as previously described.

In such a case it has been customary for the manufacturer of a transformer to thread the bolts with the usual metal nuts and send the transformers to the manufacturer, who incorporates the transformer in the radio or other device.

To mount the transformer as described heretofore and in order to get the edge of the transformer flush with the base, it has been necessary to unscrew the nuts from the bolts, set the transformer in place with the bolts threaded through suitable apertures in the base and then thread the nuts and tighten up these nuts to hold the transformer intact. Such a procedure requires a certain amount of care since the laminations are liable to come apart when the nuts are off of the bolts. Furthermore, certain transformers are only provided with two bolts for the entire assembly and carrying out the above process of bolting the transformer on the base entails annoying trouble with regard to balancing the transformer.

An object of this invention is to devise a method and means of maintaining a transformer in assembled relationship and permitting the mounting of the transformer on the base as heretofore described without the trouble previously pointed out and wherein less time is consumed.

Referring to the drawing, Figure 1 is a view of a transformer illustrating this invention.

Figure 1:
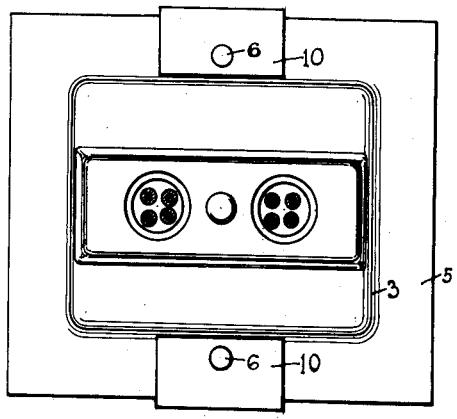

Referring to the drawing, the transformer comprises a stack of laminations 1 which enclose suitable windings not shown here but which terminate in leads 2.

Disposed at each end of the laminations are bells 3 and 4, having flanges 5 which correspond with the sides of laminations 1. Disposed on each side of bells 3 and 4 and transversally of the laminations are bolts 6, these bolts having heads 8.

In order to maintain the laminations in assembled relationship temporarily and prior to mounting, I preferably provide a strip of relatively soft breakable material as fibre 10, having an aperture just large enough so that the threaded portion 11 of bolt 6 will cut threads in the fibre 10. The fibre is pulled up tightly against flange 6 of bell 3 on each side of the transformer and has actually been found to be sufficiently strong to prevent the transformer from being forcibly pulled apart by hand. In this condition, the transformer may be handled as if steel nuts were used in place of the fibre and may be transported or shipped in the usual manner.

Figures 2, 3:
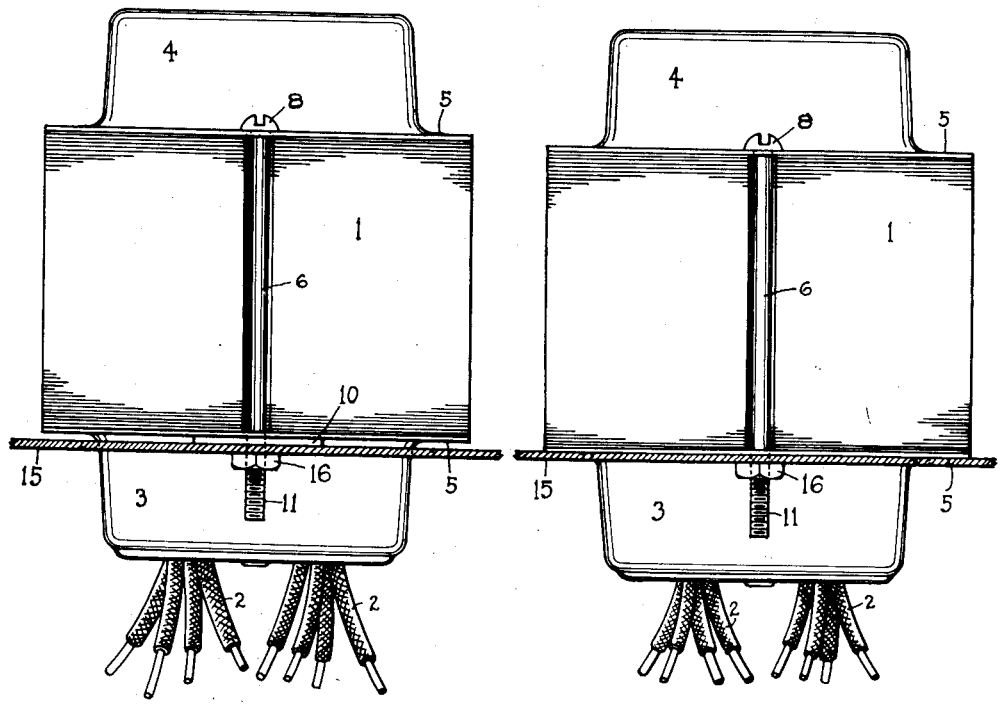
Figure 2 is an elevation of the transformer shown in Figure 1.
Figure 3 is a view of the same transformer after having been mounted on a suitable base.

When it is desired to mount the transformer on a base 15 as shown in Figure 2, the transformer is merely positioned so that the threaded parts 11 of bolts 6 project through the apertures in base 15. The fibre strips 10 are still retained. Nuts 16 are threaded on bolts 6 and prior to the final tightening a screw driver or pliers may be inserted against fibre strip 10 in such a manner as to break the fibre and force it out of position. Upon the removal of the fibre, nuts 16 may be finally tightened up and the transformer mounted as shown in Figure 3.

Figure 4:
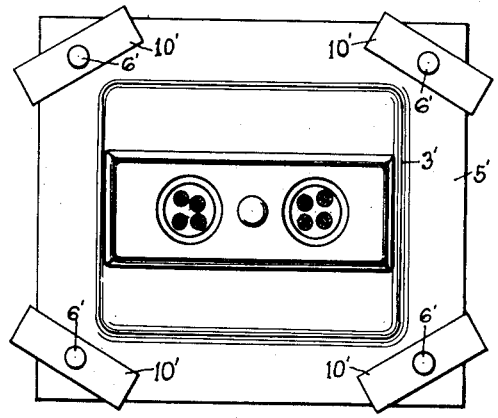
Figure 4 is a modification.

In Figures 1 to 3 inclusive I have shown a transformer with only two clamping bolts 6. In Figure 4, however, a transformer is shown with four bolts 6' and fibre strips 10'. It is obvious, however, that as many or as few bolts may be provided as desired. In fact, in the case of a transformer such as shown in Figure 4 where a multiplicity of bolts are provided it may be best to dispense with some of the fibre strips 10' and merely leave two of them at opposite corners to maintain the assembly intact. However, the fibre strips are so easy to remove and so cheap that it is preferable to provide as many fibre strips as there are bolts.

What is claimed is:

1. In a transformer having a stack of laminations and windings enclosed thereby with a plurality of bolts for clamping the laminations and wherein said bolts also serve to clamp the transformer on a support, the method of temporarily maintaining the transformer in assembled relationship which consists in drawing up a fibre strip as a nut portion tightly against the transformer, one fibre strip being provided for each bolt.

2. In a transformer of the type having a stack of laminations and windings enclosed thereby, such laminations being clamped by a plurality of bolts and wherein the same bolts are used to support the transformer in position on a base, the method which comprises drawing up a fibre nut on each bolt to maintain the stack temporarily in assembled relationship, placing the transformer in position on the base, threading metallic nuts on the bolt to maintain the transformer permanently in position and breaking and removing the fibre nuts from the bolts and thereafter tightening the metallic nuts.

3. A transformer comprising a stack of laminations and windings, a plurality of bolts passing through such laminations for clamping them together and a nut of a readily breakable material for each bolt for temporarily maintaining the laminations in clamped relationship preparatory to the final mounting.

4. The structure of claim 3 wherein said nuts are of fibre.

ARNI HELGASON.